(12) United States Patent
Liang et al.

(10) Patent No.: US 12,363,643 B2
(45) Date of Patent: Jul. 15, 2025

(54) DYNAMIC POWER NEGOTIATION OUTSIDE ENHANCED BEACON EXCHANGE IN A WIRELESS NETWORK VIA ACKNOWLEDGMENT FRAMES

(71) Applicant: TEXAS INSTRUMENTS INCORPORATED, Dallas, TX (US)

(72) Inventors: Robert Weibo Liang, Frisco, TX (US); Liangcheng Tao, Plano, TX (US); Arvind Kandhalu, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 557 days.

(21) Appl. No.: 17/491,386

(22) Filed: Sep. 30, 2021

(65) Prior Publication Data

US 2022/0346027 A1   Oct. 27, 2022

Related U.S. Application Data

(60) Provisional application No. 63/178,222, filed on Apr. 22, 2021.

(51) Int. Cl.
*H04W 52/00* (2009.01)
*H04W 4/80* (2018.01)
(Continued)

(52) U.S. Cl.
CPC .......... *H04W 52/226* (2013.01); *H04W 4/80* (2018.02); *H04W 52/0245* (2013.01); *H04W 52/242* (2013.01)

(58) Field of Classification Search
CPC . H04W 52/226; H04W 4/80; H04W 52/0245; H04W 52/242; H04W 52/245; H04W 52/48
See application file for complete search history.

(56) References Cited

U.S. PATENT DOCUMENTS

2006/0121928 A1* 6/2006 Itsuki .................. H04W 52/226
  455/522
2006/0246841 A1* 11/2006 Dennis .................. H04W 52/10
  455/63.1
(Continued)

FOREIGN PATENT DOCUMENTS

EP    1848122 A1    10/2007
WO    2021037639 A1    3/2021

OTHER PUBLICATIONS

ISO/IEC/IEEE 8802-15-4 Information Technology Telecommunications and Information Exchange between Systems—Local and Metropolitan Area Networks—Specific Requirements, Second Edition; Apr. 30, 2018; pp. 1-707.
(Continued)

*Primary Examiner* — Ayaz R Sheikh
*Assistant Examiner* — Mang Boi Thawng
(74) *Attorney, Agent, or Firm* — Michelle F. Murray; Frank D. Cimino

(57) ABSTRACT

An end device in a ZIGBEE communication protocol wireless network includes a memory configured to store computer-executable instructions and a processor coupled to the memory and configured to execute the instructions. The processor sends a first data frame to a first network device using a first network transmission power level and receives a first acknowledgment frame from the first network device. The first acknowledgement frame includes a first transmission power information element, and the first transmission power information element includes a second transmission power level. The processor updates a power control information table entry with the second transmission power level and sends a second data frame to the first network device using the second transmission power level.

35 Claims, 8 Drawing Sheets

(51) Int. Cl.
  *H04W 52/02* (2009.01)
  *H04W 52/22* (2009.01)
  *H04W 52/24* (2009.01)

(56) References Cited

U.S. PATENT DOCUMENTS

| | | | | |
|---|---|---|---|---|
| 2008/0009306 A1* | 1/2008 | Suga | ................... | H04W 52/267 |
| | | | | 455/522 |
| 2009/0262675 A1* | 10/2009 | Tsai | ................... | H04W 52/0216 |
| | | | | 370/311 |
| 2012/0269166 A1* | 10/2012 | Chin | ................ | H04W 36/0055 |
| | | | | 370/331 |
| 2012/0295654 A1* | 11/2012 | Sridhara | ............... | G01S 5/0273 |
| | | | | 455/517 |
| 2016/0286502 A1* | 9/2016 | Sugitani | .............. | H04W 52/242 |
| 2017/0280375 A1* | 9/2017 | Yoon | ..................... | H04W 48/14 |
| 2018/0077042 A1* | 3/2018 | Kim | .................. | H04L 12/4625 |
| 2021/0099962 A1* | 4/2021 | Bharadwaj | .......... | H04W 52/228 |
| 2021/0143687 A1* | 5/2021 | Park | ........................ | H02J 50/80 |
| 2022/0030452 A1* | 1/2022 | Douglas | ................ | H04L 41/142 |

OTHER PUBLICATIONS

International Search Report for PCT/US2022/025866 dated Aug. 5, 2022.

International Written Opinion for PCT/US2022/025866 dated Aug. 5, 2022.

Ikram, et al.: "Adaptive Multi-Channel Transmission Power Control for Industrial Wireless Instrumentation"; IEEE Transactions on Industrial Informatics; vol. 10; No. 2; May 2014; 13 pages.

* cited by examiner

| OCTETS | 2 | 3 | 2 | 1 | 2 |
|---|---|---|---|---|---|
| DATA TYPE | HEADER (LENGTH, GROUP ID, TYPE) | VENDOR | SUB-IE DESCRIPTOR | TX POWER | TERMINATION |

800

802: OCTETS
804: DATA TYPE
810: HEADER (LENGTH, GROUP ID, TYPE)
812: VENDOR
814: SUB-IE DESCRIPTOR
816: TX POWER
818: TERMINATION

FIG. 8

| OCTETS | 2 | 8 | 1 | 1 | 1 |
|---|---|---|---|---|---|
| DATA TYPE | SHORT ADDRESS | IEEE ADDRESS | TX POWER LEVEL | LAST RSSI LEVEL | NEGOTIATED FLAG |

900

902: OCTETS
904: DATA TYPE
910: SHORT ADDRESS
912: IEEE ADDRESS
914: TX POWER LEVEL
916: LAST RSSI LEVEL
918: NEGOTIATED FLAG

FIG. 9

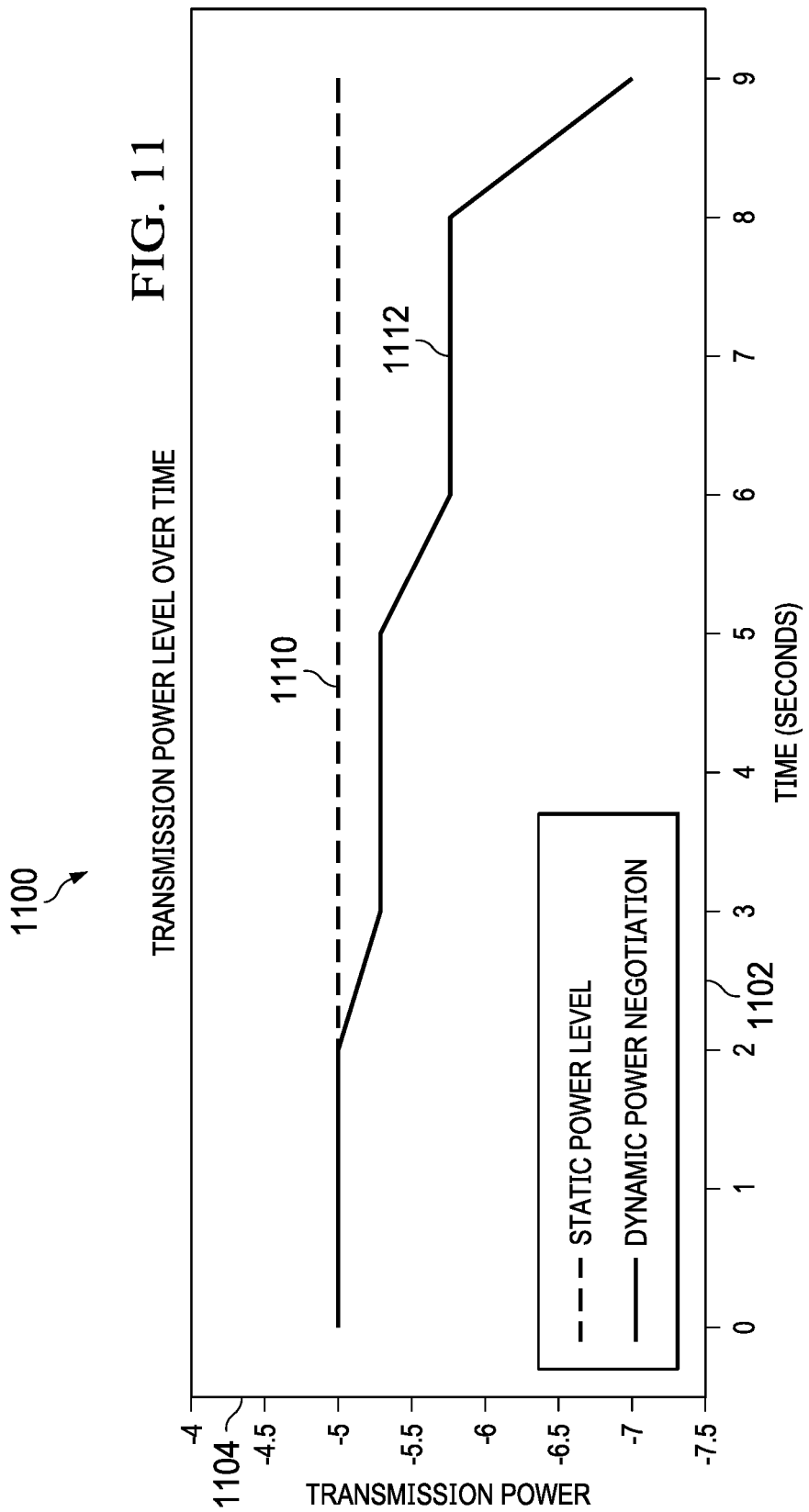

DYNAMIC POWER NEGOTIATION OUTSIDE ENHANCED BEACON EXCHANGE IN A WIRELESS NETWORK VIA ACKNOWLEDGMENT FRAMES

CROSS-REFERENCE TO RELATED APPLICATIONS

The present application claims priority to U.S. Provisional Patent Application No. 63/178,222, which was filed on Apr. 22, 2021, is titled "Enable Dynamic Power Negotiation Outside Enhanced Beacon Exchange In ZigBee Compliant Sub 1 GHz Networks Via ACK Frames," and is hereby incorporated herein by reference in its entirety.

BACKGROUND

A wireless network includes two or more electronic devices that communicate to each other over a wireless connection. The wireless connection is established using a communication protocol that defines different aspects of the communications between the electronic devices such as, but not limited to, message types, message contents, message formats, messaging sequences, and messaging rules. One example of a communication protocol is the ZIGBEE communication protocol. The ZIGBEE communication protocol is an Institute of Electrical and Electronics Engineers (IEEE) 802.15.4-based specification. The ZIGBEE communication protocol is designed to create networks with small, low-power digital radios. For instance, the ZIGBEE communication protocol may be used to communicate information between electronic devices in home automation systems, wireless sensor networks, industrial control systems, embedding sensing, medical data collection, security systems, building automation, and other types of systems.

SUMMARY

In accordance with at least one example of the disclosure, an end device in a ZIGBEE communication protocol wireless network includes a memory configured to store computer-executable instructions and a processor coupled to the memory and configured to execute the instructions. The processor sends a first data frame to a first network device using a first network transmission power level and receives a first acknowledgment frame from the first network device. The first acknowledgement frame includes a first transmission power information element, and the first transmission power information element includes a second transmission power level. The processor updates a power control information table entry with the second transmission power level and sends a second data frame to the first network device using the second transmission power level.

In accordance with another example of the disclosure, a first electronic device in a wireless network is configured to receive a communication message from a second electronic device in the wireless network through a communication link between the first electronic device and the second electronic device, where the communication message comprises a first transmission power level used to transmit the communication message on the communication link. The first electronic device calculates a path loss associated with the communication message by subtracting the first transmission power level from a received signal strength indicator of the communication message, calculates a second transmission power level by subtracting the path loss associated with the communication message from a target received signal strength indicator, and updates a power control information table entry stored in the first electronic device with the second transmission power level.

In accordance with yet another example of the disclosure, an electronic device is configured to perform an initial transmission power negotiation when joining a wireless network, receive a number of communication messages from a communication link in the wireless network, compare the number of communication messages to a preset number of communication messages, and perform a transmission power renegotiation when the number of communication messages is equal to the preset number of communication messages.

BRIEF DESCRIPTION OF THE DRAWINGS

For a detailed description of various examples, reference will now be made to the accompanying drawings in which:

FIG. 8 is a schematic diagram of a transmission power information element in accordance with various examples.

FIG. 9 is a schematic diagram of a format of a power control interface (PCI) table entry in accordance with various examples.

FIG. 11 is a graph comparing the transmission power level over time for a static power level use scenario and for a dynamic power negotiation use scenario in accordance with various examples.

DETAILED DESCRIPTION

In some communication protocols, a transmission power used to communicate between two electronic devices in a wireless network may be initially determined during a device scan phase when one of the electronic devices joins the wireless network. If the transmission power is to be adjusted later, an electronic device may send another message (e.g., a link power delta command) after joining the wireless network to adjust the transmission power with a device it is communicating with. For instance, the electronic device may periodically wake up from a sleeping state to transmit a link power delta command that includes a full command frame to adjust the transmission power. In such cases, the above transmission power adjustment method may require extra power, because the electronic device needs to wake up from the sleeping state and send a separate power adjustment message, both of which consume power. This extra power consumption is particularly undesirable in battery-powered electronic devices.

Disclosed herein are examples of dynamic power negotiation in a wireless network. A transmission power used by an electronic device to communicate with another electronic device in the wireless network may be initially determined during a device scan phase when the electronic device joins the wireless network. Additionally, the device can later adjust its transmission power by adding power transmission information to a pre-existing message. For instance, a transmission power information element may be added to a medium access control (MAC) acknowledgment frame. The transmission power information element may include information about the transmission power used by the electronic device to communicate over a communication link. This information may be used to determine whether the transmission power is to be adjusted and may be used to adjust the transmission power when needed. Accordingly, a separate message is not sent to adjust the transmission power after the electronic device initially joins the wireless network. Instead, the power transmission information is added to the pre-existing message and a full separate message is not sent. This also reduces the number of times the electronic device wakes up from a sleep state. Accordingly, examples of dynamic power negotiation in the wireless network may reduce power consumption. This may be useful in power sensitive wireless networks such as wireless networks that use battery powered devices.

Figure 1:
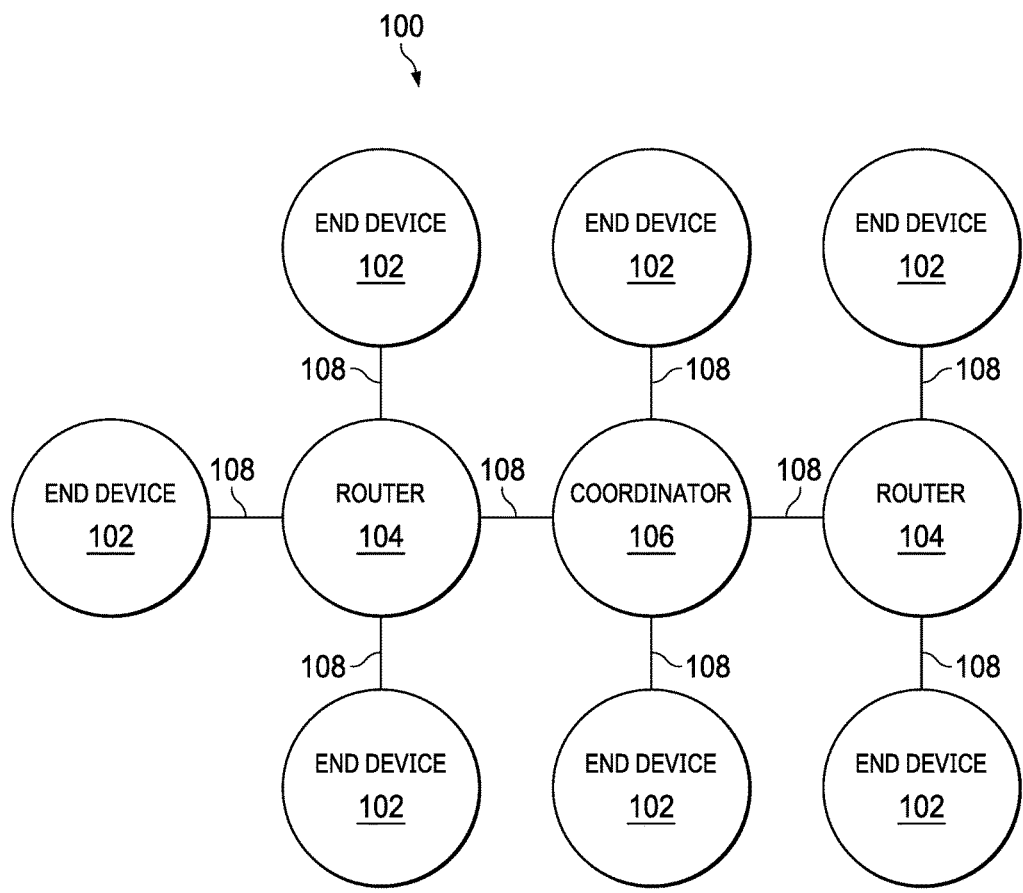
FIG. 1 is a schematic diagram of a wireless network in accordance with various examples.

FIG. 1 is a schematic diagram of a wireless network 100 in accordance with various examples. The wireless network 100 includes end devices 102, routers 104, and a coordinator 106. The end devices 102, the routers 104, and the coordinator 106 are wirelessly connected by communication links 108. The wireless network 100 shown in FIG. 1 has seven end devices 102 and two routers 104. However, the wireless network 100 may include any number of end devices 102 and routers 104. Also, the end devices 102, the routers 104, and the coordinator 106 may be connected using any network topology and are not limited to the specific network topology shown in the example in FIG. 1.

Each end device 102 is connected through a communication link 108 to one of the routers 104 or the coordinator 106 and is only capable of directly communicating with the router 104 or the coordinator 106 to which it connects. In some examples, each communication link 108 may be associated with its own transmission power that is to be used by the devices communicating over that communication link 108. Accordingly, the communication links 108 may use different transmission powers. The transmission power used for each of the communication links 108 may be determined and/or adjusted using examples of the present disclosure to reduce power consumption. For instance, a transmission power used by an electronic device for one of the communication links 108 may be reduced as a distance of one of the communication links 108 is reduced (e.g., as the electronic device moves towards another electronic device that it is communicating with over one of the links 108). The communication links 108 may operate on a radio frequency band having a frequency of less than 1 gigahertz such as, but not limited to, a 700 megahertz band (e.g., a 784 megahertz band), an 800 megahertz band (e.g., an 868 megahertz band), a 900 megahertz band (e.g., a 915 megahertz band), or any other frequency. Additionally, in some examples, the end devices 102 may be a low-power device (e.g., a sensor or a display) that is powered by a battery. Accordingly, reducing the amount of power used by the end devices 102 reduces the amount of maintenance (e.g., replacing batteries) needed to keep the wireless network 100 functioning.

Each router 104 routes traffic between the end devices 102, the other routers 104, and the coordinator 106. For instance, each router 104 receives and stores messages being sent to the end devices 102 connected to the router 104. Each router 104 may also enable new end devices 102 that are not part of the wireless network 100 to join the wireless network 100.

The coordinator 106 may provide the same functionality as one of the routers 104. Additionally, in examples, the coordinator 106 is the first device to become part of the wireless network 100 and thus forms the wireless network 100. The coordinator 106 stores information about the wireless network 100 and may act as a bridge to another network if the wireless network 100 is connected to another network.

Figure 2:
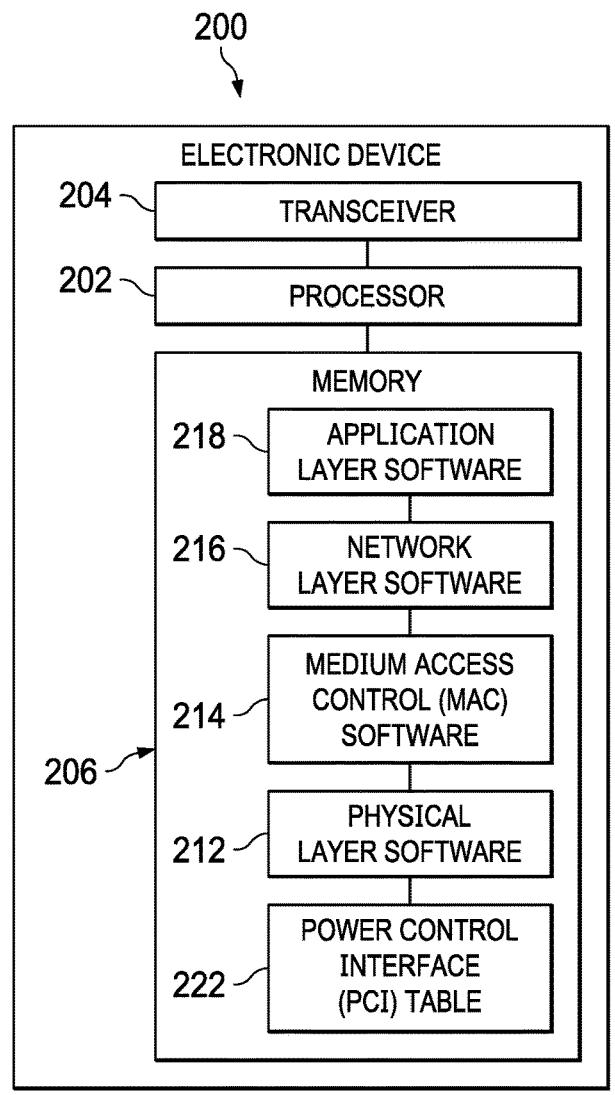
FIG. 2 is a schematic block diagram of an electronic device in accordance with various examples.

FIG. 2 is a schematic block diagram of an electronic device 200 in accordance with various examples. The electronic device 200 may be used as any of the end devices 102, the routers 104, and the coordinator 106 in the wireless network 100 in FIG. 1. The electronic device 200 may be in home automation systems, wireless sensor networks, industrial control systems, embedding sensing, medical data collection, security systems, building automation, and other types of systems. For instance, the electronic device 200 may be a smart hub, a voice assistant, a switch, a thermostat, a motion sensor, a valve, a thermometer, a hygrometer, a smart plug, a window and door sensor, a smoke alarm, a light, a siren, a leak detector, or a dimmer.

The electronic device 200 may include a processor 202, a transceiver 204 coupled to the processor 202, and a memory 206 coupled to the processor 202. The processor 202 is configured to execute computer-executable instructions stored on the processor 202 or in the memory 206 to perform logic and control the functions of the electronic device 200. The transceiver 204 may include a wireless radio frequency transmitter and receiver that is able to communicate with other electronic devices. In some examples, the transceiver 204 may operate on a radio frequency band having a frequency of less than 1 gigahertz (e.g., a sub-1 gigahertz radio). The memory 206 may store computer-executable instructions needed to implement the functions of the electronic device 200. In some examples, the memory 206 may include a non-transitory medium, and instructions (e.g., computer-executable instructions) are stored on the non-transitory medium. In such a case, the processor 202 may be configured to execute the instructions stored on the non-transitory medium to perform a method (e.g., a method for power negotiation in a wireless network).

In some examples, the memory 206 stores software to implement the ZIGBEE communication protocol that is an IEEE 802.15.4-based specification. In such a case, the memory 206 may include physical layer software 212, MAC layer software 214, network layer software 216, and application layer software 218. The physical layer software 212 provides electrical, mechanical, and procedural interfaces to the transmission medium. The MAC layer software 214 provides an interface to the physical layer software 212 and controls the hardware responsible for interaction with the transmission medium. The network layer software 216 provides an interface to the MAC layer software 214 and controls message forwarding and routing. The application layer software 218 provides an interface to the network layer software 216 and specifies communication protocols and interface methods used by devices in the communication network. The memory 206 may also include a PCI table 222 that stores transmission powers to be used when communicating with other devices. For instance, the electronic device 200 may store a transmission power to be used with each other device to which it connects in a wireless network, such as the wireless network 100 (FIG. 1).

Figure 3:
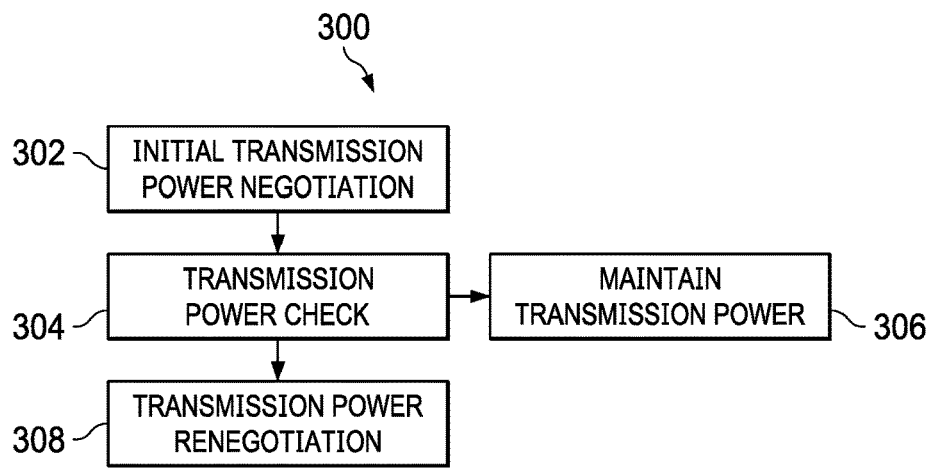
FIG. 3 is a process flow diagram of a method for controlling power negotiation in a wireless network in accordance with various examples.

FIG. 3 is a process flow diagram of a method 300 for controlling power negotiation in a wireless network in accordance with various examples. At block 302, an initial transmission power negotiation is performed between an electronic device joining a wireless network and another electronic device that is already part of the wireless network. In some examples, the initial transmission power negotiation is performed when an electronic device joins the wireless network. Example methods for performing the initial transmission power negotiation are described below with reference to FIG. 4. At block 304, a transmission power check is performed after the electronic device has joined the wireless network. If the transmission power check indicates that a transmission power adjustment is not needed, the electronic device maintains the previously negotiated transmission power at block 306. Example methods for performing a transmission power check are described below with reference to FIG. 5. If the transmission power check indicates that a transmission power adjustment is needed, the electronic device performs a transmission power renegotiation at block 308. Example methods for performing a transmission power renegotiation are described below with reference to FIG. 6.

Figure 4:
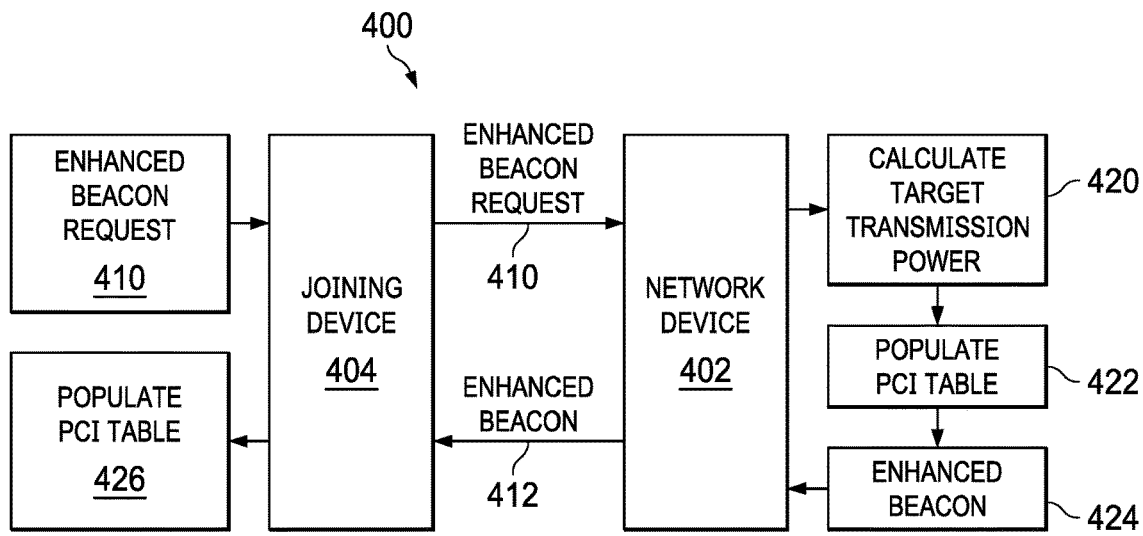
FIG. 4 is a schematic block diagram depicting the performance of an initial transmission power negotiation between a network device and a joining device in accordance with various examples.

FIG. 4 is a schematic block diagram 400 of performing an initial transmission power negotiation between a network device 402 (e.g., a device that is already part of a wireless network) and a joining device 404 (e.g., a device that is attempting to join the wireless network) in accordance with various examples. The joining device 404 generates an enhanced beacon request message 410 and sends the enhanced beacon request message 410 to the network device 402. In some examples, the enhanced beacon request message 410 is transmitted at a maximum transmission power of the joining device 404 and may include a vendor-specific information element indicating that the joining device 404 supports performing a power renegotiation process later using an acknowledgment message. The vendor-specific information element may include 2 bytes of information, but the vendor-specific information element may use any amount of information to indicate that it supports performing the power renegotiation process. After receiving the enhanced beacon request message 410, the network device 402 calculates the target transmission power for the network device 402 and the joining device 404 to use in communications on a communication link between the network device 402 and the joining device 404 at block 420. For instance, the network device 402 may use the method 700 of performing a target power calculation shown in FIG. 7 and described below. After the network device 402 calculates the target transmission power, the network device 402 populates its PCI table with the target transmission power at block 422. Then, the network device 402 generates an enhanced beacon message 412 and sends the enhanced beacon message 412 to the joining device 404 at block 424. The enhanced beacon message 412 may include the target transmission power. Also, in some examples, the enhanced beacon message 412 may include a vendor-specific information element indicating that the network device 402 supports performing the power renegotiation process later. The vendor-specific information element indicating that the network device 402 may be stored by the network device 402 (e.g., in a memory of the network device 402) and may be retrieved and added to the enhanced beacon message 412. The joining device 404 receives the enhanced beacon message 412 and populates its PCI table with the target transmission power at block 426. Accordingly, after the initial transmission power negotiation is performed, the network device 402 and the joining device 404 can use the calculated target transmission power when communicating with each other over their communication link until a new target transmission power is calculated.

Figure 5:
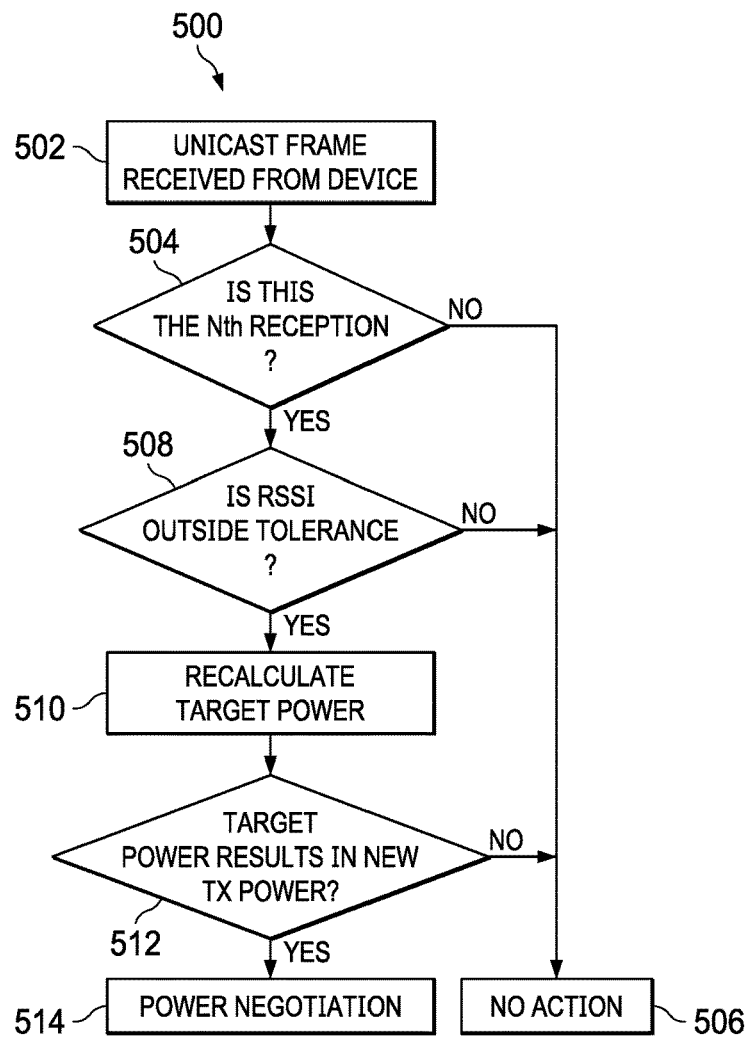
FIG. 5 is a process flow diagram of a method for determining whether a transmission power renegotiation between two network devices is to be performed in accordance with various examples.

FIG. 5 is a process flow diagram of a method 500 for determining whether a transmission power renegotiation between two network devices needs to be performed in accordance with various examples. At block 502, a receiving network device (e.g., a router such as router 104 in FIG. 1 or a coordinator such as coordinator 106 in FIG. 1 in a wireless network such as wireless network 100 in FIG. 1) receives a communication message (e.g., a unicast frame) from a sending network device (e.g., an end device or a router in the wireless network). At block 504, the receiving network device determines a number of communication messages that have been received from the sending network device since an initial power negotiation or a power renegotiation has been performed between the receiving network device and the sending network device. The receiving network device compares that number to a preset number of communication messages. The preset number of communication messages may be any number of communication messages and may be set by a manufacturer, a vendor, an end user, or any other person or group or may be determined autonomously based on operating conditions or a need. If the currently received communication message is less than the preset number of communication messages, no action is taken and the receiving network device and the sending network device continue to use the previously negotiated or renegotiated transmission power at block 506. If the currently received communication message is equal to the preset number of communication messages, the receiving network device proceeds to determine whether a received signal strength indicator (RSSI) of the currently received communication message is within or outside of a preset tolerance value at block 508.

The RSSI of the currently received communication message is an estimated power level that the receiving network device is receiving the communication message from the sending network device. At block 508, the receiving network device compares the RSSI of the currently received communication message to a preset RSSI. For instance, the preset RSSI may be any RSSI value, sets of values (e.g., a lower RSSI and an upper RSSI), ranges of values, etc. and may be set by a manufacturer, a vendor, an end user, or any other person or group or may be determined autonomously based on operating conditions or a need. If the RSSI of the currently received communication message is within the preset RSSI, no action is taken and the receiving network device and the sending network device continue to use the previously negotiated or renegotiated transmission power at block 506. If the RSSI of the currently received communication message is outside the preset RSSI, the receiving network device recalculates a target transmission power to be used with communications between the sending network device and the receiving network device at block 510. For instance, the receiving network device may use the method 700 of performing a target power calculation shown in FIG. 7 and described below.

At block 512, the receiving network device compares the recalculated target transmission power to the currently used transmission power. The recalculated target transmission power may be the same as the currently used transmission power. This indicates that transmission power cannot be changed to a more optimal level. In such a case, no action is needed and the receiving network device and the sending network device continue to use the previously negotiated or renegotiated transmission power at block 506. If the recalculated target transmission power is different than the currently used transmission power, this indicates that the transmission power may be changed to a more optimal level. In such a case, the receiving network device performs transmission power renegotiation at block 514 to change the transmission power being used by the sending network device and the receiving network device on the link used for communications between the sending network device and the receiving network device.

Figure 6:
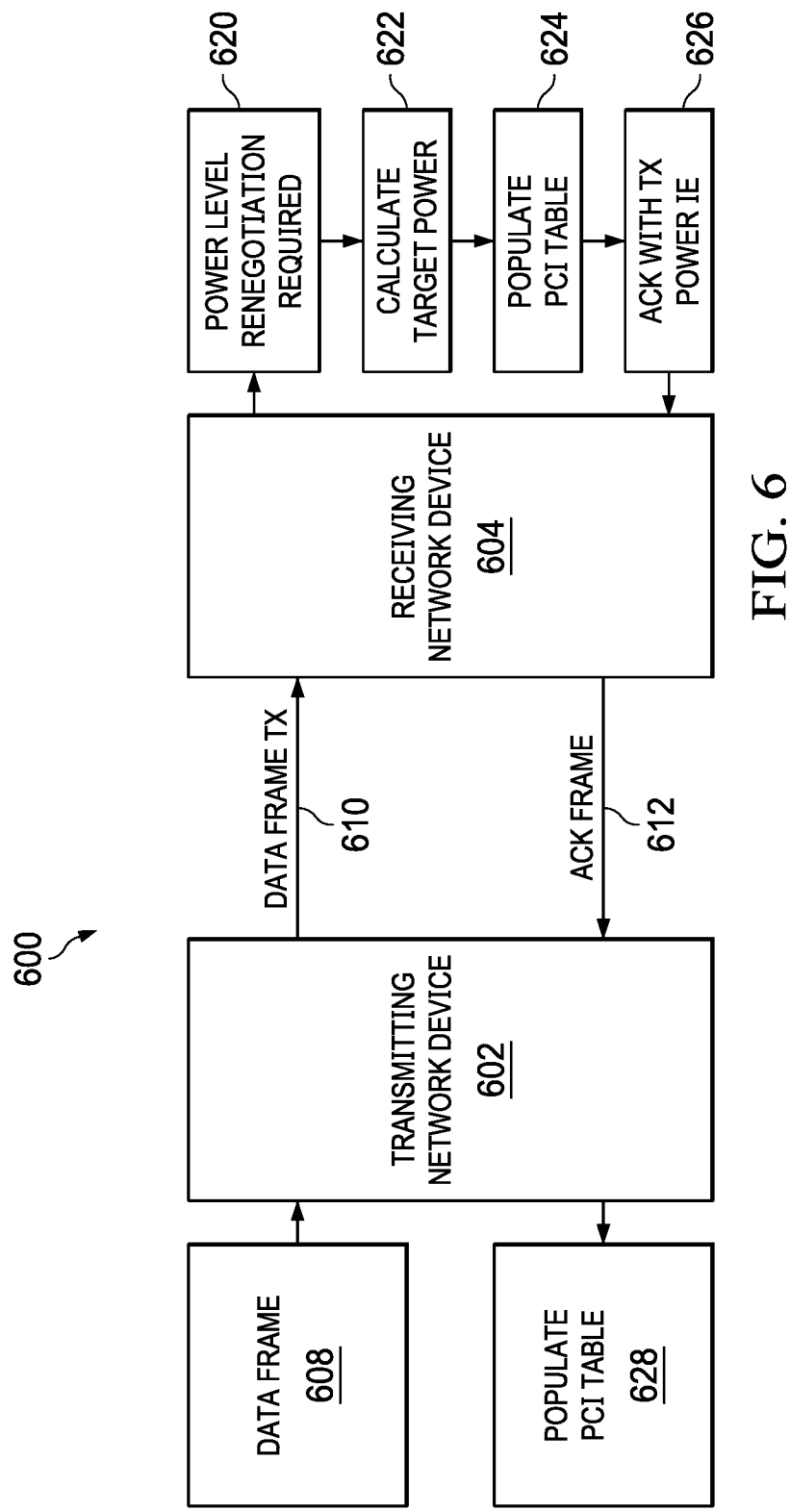
FIG. 6 is a schematic block diagram depicting the performance of a transmission power renegotiation between a transmitting network device and a receiving network device in accordance with various examples.

FIG. 6 is a schematic block diagram of performing a transmission power renegotiation 600 between a transmitting network device 602 such as an end device 102 in FIG. 1 and a receiving network device 604 such as a router 104 in FIG. 1 in accordance with various examples. The transmitting network device 602 generates a data frame at block 608 and sends the data frame to the receiving network device 604 at block 610. The transmission data frame may be sent at a transmission power level currently being used by the transmitting network device 602 and the receiving network device 604 for communications on the communication link connecting the transmitting network device 602 and the receiving network device 604. For instance, the transmission power level currently being used may be a transmission power level calculated when the transmitting network device 602 initially joined the wireless network or may be a renegotiated transmission power level calculated during a previous renegotiation process. In some examples, the transmission power level currently being used is stored in a PCI table of the transmitting network device 602 and a PCI table of the receiving network device 604.

At block 620, the receiving network device 604 determines that transmission power level renegotiation is required. At block 622, the receiving network device 604 calculates a new target transmission power level to be used by the transmitting network device 602 and the receiving network device 604. For instance, the receiving network device 604 may use the method 700 of performing a target power calculation shown in FIG. 7 and described below to calculate the new target transmission power level to be sent by the transmitting network device 602 and the receiving network device 604. At block 624, the receiving network device 604 populates its PCI table with the new target transmission power level, and at block 626, the receiving network device 604 generates an acknowledgment frame to be sent to the transmitting network device 602. The acknowledgment frame may include an information element (e.g., a transmission power information element) that includes the new target transmission power level. An example of a transmission power information element is shown in FIG. 8 and is described below. Accordingly, a separate message is not sent to adjust the transmission power after the electronic device initially joins the wireless network. Instead, the power transmission information is added to the pre-existing message and a full separate message is not sent. This also reduces the number of times the electronic device wakes up from a sleep state. Accordingly, examples of dynamic power negotiation in the wireless network may reduce power consumption.

Once the receiving network device 604 generates the acknowledgment frame at block 626, the receiving network device 604 sends the acknowledgment frame 612 to the transmitting network device 602. The transmitting network device 602 receives the acknowledgment frame and uses information within the acknowledgment frame (e.g., the new target transmission power level) to populate its PCI table at block 628. For instance, the transmitting network device 602 may replace a transmission power level previously stored in its PCI table with the new target transmission power level. Accordingly, after the transmission power renegotiation 600 is performed, the transmitting network device 602 and the receiving network device 604 use the new target transmission power level when communicating with each other.

Figure 7:
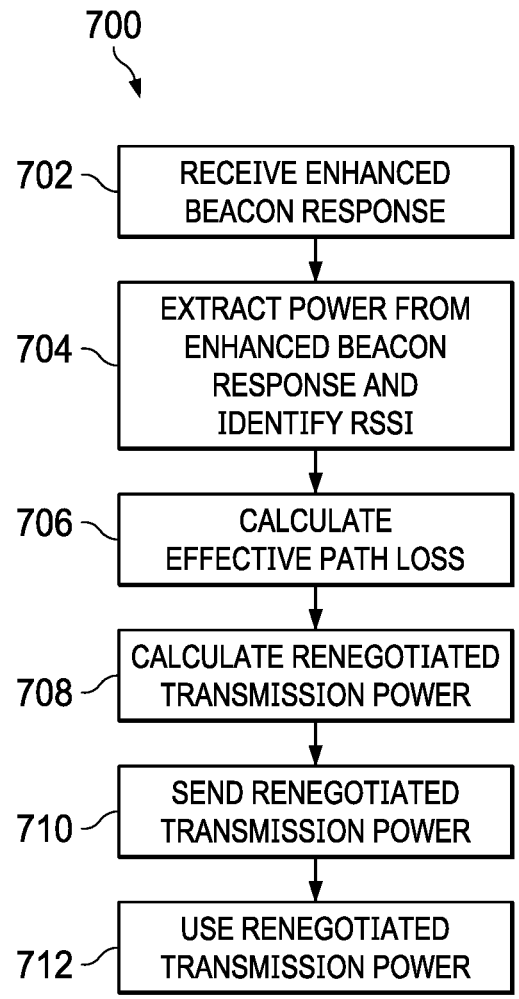
FIG. 7 is a process flow diagram of a method for performing a target power calculation in accordance with various examples.

FIG. 7 is a process flow diagram of a method 700 of performing a target power calculation in accordance with various examples. At block 702, an enhanced beacon response is received. The enhanced beacon response may include a transmission power information element that includes the transmission power of the enhanced beacon response. At block 704, the transmission power is extracted from the enhanced beacon response, and the RSSI of the enhanced beacon response is identified. At block 706, the effective path loss is calculated. In some examples, the effective path loss is calculated using equation 1.

Equation 1: $PATHLOSSpwr = EBRRSSI - TXPOWERpwr$ (1)

In Equation 1, PATHLOSSpwr is the effective path loss and may be expressed in the units of decibel-milliwatts. EBRRSSI is the RSSI of the enhanced beacon response and may be expressed in the units of decibel-milliwatts, and TXPOWERpwr is the transmission power of the enhanced beacon response in the units of decibel-milliwatts.

Once the effective path loss is calculated, the renegotiated transmission power is calculated at block 708. The renegotiated transmission power may be the transmission power necessary to overcome the effective path loss. In some examples, the renegotiated transmission power is calculated using equation 2.

Equation 2: $EBPWR = OPTRSSI + PATHLOSSpwr$ (2)

In equation 2, EBPWR is the renegotiated transmission power and may be expressed in the units of decibel-milliwatts. The OPTRSSI is the optimum RSSI and may be expressed in the units of decibel-milliwatts, and the PATHLOSSpwr is the effective path loss (e.g., as determined using equation 1) and may be expressed in the units of decibel-milliwatts. In some examples, the optimum RSSI may be set to a value that reduces power consumption without sacrificing signal quality. The optimum RSSI may be set by a manufacturer, a vendor, an end user, or any other person or group or may be determined autonomously based on operating conditions as needed.

Once the renegotiated transmission power is calculated, the renegotiated transmission power is sent to the transmitting network device at block 710, and at block 712, both the transmitting network device and the receiving network device use the renegotiated transmission power to communicate over the link between the transmitting network device and the receiving network device.

FIG. 8 is a schematic diagram of a transmission power information element 800 in accordance with various examples. The transmission power information element 800 may be added to a frame in an initial transmission power negotiation or in a transmission power renegotiation. For instance, the transmission power information element 800 may be added to an enhanced beacon request during an initial power negotiation or to a MAC acknowledgment frame in a transmission power renegotiation after the initial power negotiation. Accordingly, a separate message is not sent to adjust the transmission power after the electronic device initially joins the wireless network. Instead, the power transmission information is added to the pre-existing message and a full separate message is not sent. This also reduces the number of times the electronic device wakes up from a sleep state. Accordingly, examples of dynamic power negotiation in the wireless network may reduce power consumption.

The top row of the transmission power information element 800 indicates a data size 802, and the bottom row of the transmission power information element 800 indicates a data type 804. The data sizes 802 are expressed in a number of octets, where one octet includes eight bits of information. The data sizes 802 shown in the transmission power information element 800 are for illustration purposes only. The data sizes 802 are not limited to any particular data sizes.

The data types 804 include a power information element header 810, a vendor organizationally unique identifier 812, a sub-information element descriptor 814, a transmission power 816, and a power information element termination 818. The power information element header 810 may include two octets of information and includes a length, a group identifier, and a type of the transmission power information element 800. The vendor organizationally unique identifier 812 may include three octets of information and includes a number that uniquely identifies a vendor, a manufacturer, or an organization. The sub-information element descriptor 814 may include two octets of information and includes a description of a power characteristic. The transmission power 816 may include one octet of information and includes a transmission power currently being used, and the power information element termination 818 may include two octets of information and includes an indication of the end of the transmission power information element 800.

FIG. 9 is a schematic diagram of a format of a PCI table entry 900 in accordance with various examples. Each device in a wireless network may include a PCI table having an entry such as the PCI table entry 900 for each other device in the wireless network that the device is connected to with a link. The top row of the PCI table entry 900 indicates a data size 902, and the bottom row of the PCI table entry 900 indicates a data type 904. The data sizes 902 are expressed in a number of octets, where one octet includes eight bits of information. The data sizes 902 shown in the PCI table entry 900 are for illustration purposes only. The data sizes 902 are not limited to any particular data sizes and can include any data sizes.

The data types 904 include a short address 910, an IEEE address 912, a transmission power level 914, a last RSSI level 916, and a network layer negotiated flag 918. The short address 910 may include two octets of information and includes a short address of another network device. For instance, the short address 910 may be a 16 bit number that uniquely identifies the other network device on the wireless network. The IEEE address 912 may include eight octets of information and includes an IEEE address of the other network device that uniquely identifies the other network device on the wireless network in an IEEE specified format. The transmission power level 914 may include one octet of information and indicates the previously negotiated or renegotiated transmission power level between the network device storing the PCI table entry 900 and the other network device that it is connected to with the link. The last RSSI level 916 may include one octet of information and includes the RSSI level of a last communication message received from the other network device. The network layer negotiated flag 918 may include one octet of information and includes a flag that indicates whether the other network device has joined or rejoined the wireless network. For instance, the network layer negotiated flag 918 may be set to "1" indicating that the other network device has successfully joined or rejoined the wireless network, and the network layer negotiated flag 918 may be set to "0" indicating that the other network device is not joined or rejoined to the wireless network. In some examples, a network device may periodically (e.g., once every ten seconds or at another preset time interval) check for entries in its PCI table having a network layer negotiated flag set to "0" and delete that entry.

Figure 10:
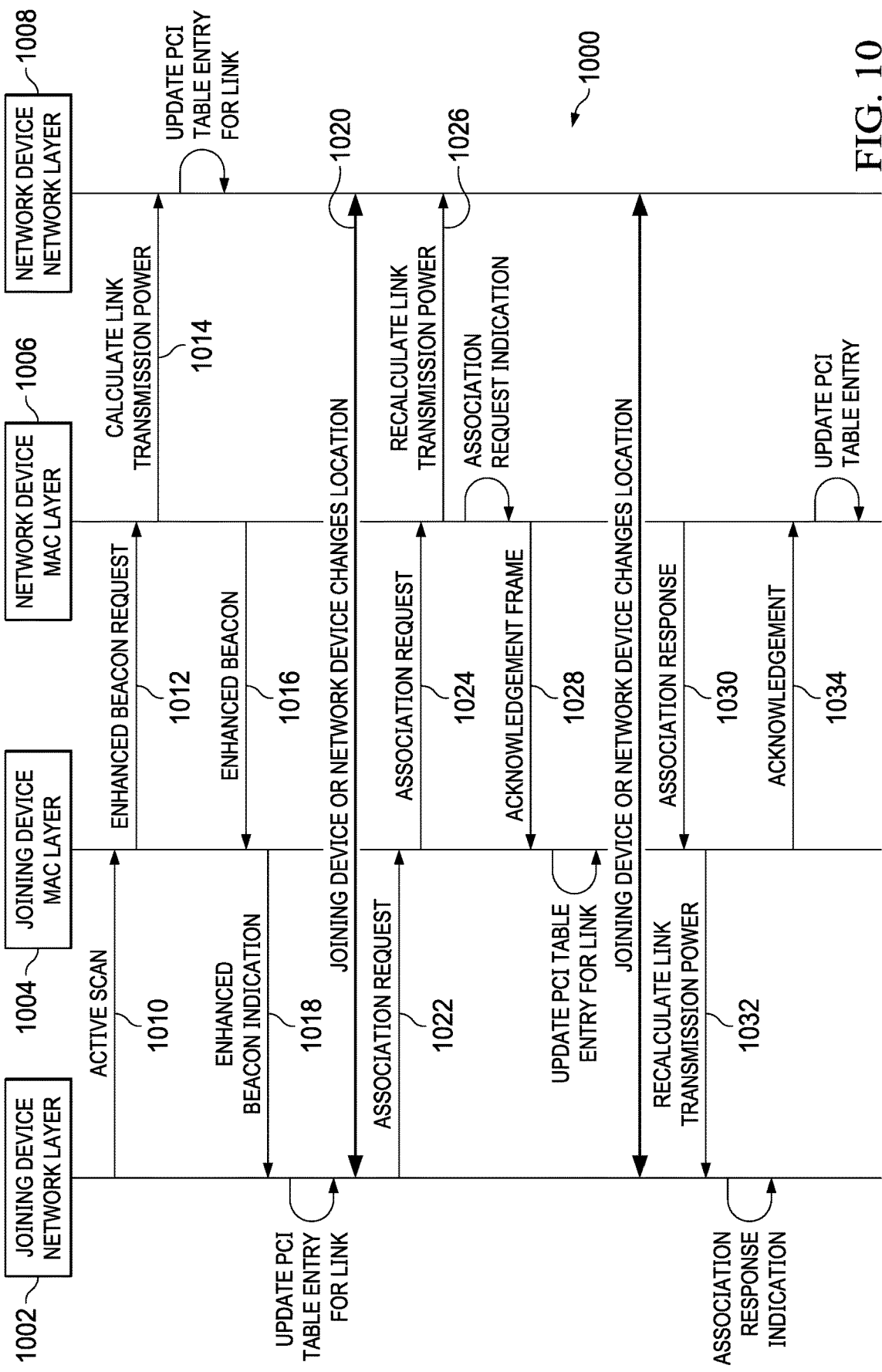
FIG. 10 is a message flow for dynamic power negotiation in a wireless network in accordance with various examples.

FIG. 10 is a message flow 1000 for dynamic power negotiation in a wireless network in accordance with various examples. The message flow 1000 is performed with a joining device network layer 1002, a joining device MAC layer 1004, a network device MAC layer 1006, and a network device network layer 1008. The joining device network layer 1002 and the joining device MAC layer 1004 may be implemented by a device joining a wireless network device such as an end device 102 in FIG. 1, and the network device MAC layer 1006 and the network device network layer 1008 may be implemented by a network device such as a router 104 in FIG. 1. At step 1010, the joining device network layer 1002 sends an active scan message to the joining device MAC layer 1004. The active scan message may include an enhanced beacon join message or an enhanced beacon rejoin message. At step 1012, the joining device MAC layer 1004 sends an enhanced beacon request to the network device MAC layer 1006. The enhanced beacon request may be sent at the maximum transmission power and may include a transmission power information element. At step 1014, the network device MAC layer 1006 calculates the link transmission power and sends a message to the network device network layer 1008 to update the PCI table entry for the link between the joining device and the network device. At step 1016, the network device MAC layer 1006 sends an enhanced beacon to the joining device MAC layer 1004. The enhanced beacon may include a transmission power information element that includes the calculated link transmission power. At step 1018, the joining device MAC layer 1004 sends an enhanced beacon indication to the joining device network layer 1002 that includes the calculated link transmission power, and the joining device network layer 1002 updates the PCI table entry for the link between the joining device and the network device. After step 1018, the joining device and the network device may use the calculated link transmission power when communicating across the link between the joining device and the network device.

At block 1020, either one or both of the joining device and the network device changes location, and the path loss between the joining device and the network device changes. Accordingly, the link transmission power may be renegotiated. At step 1022, the joining device network layer 1002 sends an association request to the joining device MAC layer 1004. At step 1024, the joining device MAC layer 1004 sends the association request at the previously calculated link transmission power to the network device MAC layer 1006. At step 1026, the network device MAC layer 1006 recalculates the link transmission power to generate a renegotiated link transmission power, adds a transmission power information element including the renegotiated link transmission power to an acknowledgment frame, updates the PCI table entry with the renegotiated link transmission power, and sends an association request indication to the network device network layer 1008. At step 1028, the network device MAC layer 1006 sends an acknowledgment frame to the joining device MAC layer 1004 that includes the renegotiated link transmission power, and the joining device MAC layer 1004 updates the PCI table entry with the renegotiated link transmission power. After step 1028, the joining device and the network device may use the renegotiated link transmission power when communicating across the link between the joining device and the network device.

After step 1028, either one or both of the joining device and the network device changes location again, and the path loss between the joining device and the network device changes. Accordingly, the link transmission power may be renegotiated a second time. At step 1030, the network device MAC layer 1006 sends an association response at the renegotiated link transmission power to the joining device MAC layer 1004. At step 1032, the joining device MAC layer 1004 recalculates the link transmission power to generate a second renegotiated link transmission power, adds a transmission power element that includes the second renegotiated link transmission power to an acknowledgment frame, updates the PCI table entry with the second renegotiated link transmission power, and sends an association response indication to the joining device network layer 1002. At step 1034, the joining device MAC layer 1004 sends an acknowledgment frame with the second renegotiated link transmission power to the network device MAC layer 1006, and the network device MAC layer 1006 updates the PCI table entry with the second renegotiated link transmission power. After step 1034, the joining device and the network device may use the second renegotiated link transmission power when communicating across the link between the joining device and the network device.

FIG. 11 is a graph 1100 comparing theoretical transmission power levels over time for a static power level use scenario 1110 and for a dynamic power negotiation use scenario 1112. The horizontal or x-axis 1102 represents time in seconds. The vertical or y-axis 1104 represents the transmission power in decibels-milliwatt. The static power level use scenario 1110 shows an example of a transmission power level when the transmission power is set when a device (e.g., an end device 102 in FIG. 1) joins a wireless network (e.g., wireless network 100 in FIG. 1) and is not later renegotiated, and the dynamic power negotiation use scenario 1112 shows an example of a transmission power level when the transmission power is dynamically renegotiated after a device joins a wireless network. The static power level use scenario 1110 and the dynamic power negotiation use scenario 1112 are theoretical examples of power levels. Actual power levels may vary based on the environments of the devices.

Both the static power level use scenario 1110 and the dynamic power negotiation use scenario 1112 include a coordinator communicating with a device that is moving towards it. The device is initially 10 meters away from the coordinator and moves towards the coordinator at a speed of 1 meter per a second for 9 seconds until the device is at a final distance of 1 meter from the coordinator. Additionally, the dynamic power negotiation use scenario 1112 uses a target received power level of −5 decibel s-milliwatt and a renegotiation period of 3 seconds.

As can be seen in FIG. 11, the static power level use scenario 1110 stays at a constant transmission power level of −5 decibels-milliwatt for the entire 9 seconds displayed in the graph 1100. The dynamic power negotiation use scenario 1112 starts at the transmission power level of −5 decibels-milliwatt. However, as the device moves towards the coordinator, the transmission power level decreases until it reaches a final value of −7 decibels-milliwatt at the end of the 9 seconds. Over the 9 seconds, the transmission power is on average 0.532 decibels-milliwatt less for the dynamic power negotiation use scenario 1112. Accordingly, the dynamic power negotiation use scenario 1112 reduces power consumption as compared to the static power level use scenario 1110.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. An electronic device comprising:
a memory configured to store computer-executable instructions; and
a processor coupled to the memory and configured to execute the instructions, wherein the instructions cause the processor to be configured to:
send a first data frame to a first network device using a first transmission power level;
receive a first acknowledgment frame responsive to the first data frame from the first network device, wherein the first acknowledgment frame comprises a first transmission power information element, and wherein the first transmission power information element comprises a second transmission power level;
update a first power control information table entry with the second transmission power level;
send a second data frame to the first network device using the second transmission power level;
send a third data frame to a second network device using a third transmission power level;
receive a second acknowledgment frame from the second network device, wherein the second acknowledgment frame comprises a second transmission power information element, and wherein the second transmission power information element comprises a fourth transmission power level;
update a second power control information table entry with the fourth transmission power level; and
send a fourth data frame to the second network device using the fourth transmission power level.

2. The electronic device of claim 1, wherein the instructions further cause the processor to be configured to store a power control information table in a memory of the electronic device, and wherein the power control information table comprises the first power control information table entry and the second power control information table entry.

3. The electronic device of claim 2, wherein the power control information table comprises an address, a transmission power level, and a last received signal strength indicator for each of the first power control information table entry and the second power control information table entry.

4. The electronic device of claim 1, wherein the first power transmission information element comprises a vendor identifier.

5. The electronic device of claim 1, wherein the instructions further cause the processor to be configured to:
make a first determination of a number of communication messages received since a previous power negotiation;
compare the number of the communication messages to a preset number of communication messages; and
calculate a path loss, calculate the second transmission power level, and update the first power control information table entry responsive to the number of the communication messages equaling the preset number of communication messages.

6. The electronic device of claim 1, wherein the electronic device is configured to operate in an IEEE 802.15.4-based wireless network.

7. The electronic device of claim 6, wherein the electronic device is configured to operate as an end device in a ZIGBEE communication protocol wireless network.

8. An electronic device comprising:
a memory configured to store computer-executable instructions; and
a processor coupled to the memory and configured to execute the computer-executable instructions, wherein the instructions cause the processor to be configured to:
receive a first communication message from a second electronic device in a wireless network through a communication link between the electronic device and the second electronic device, wherein the first communication message comprises a first transmission power level used to transmit the first communication message over the communication link;
calculate a path loss associated with the first communication message by subtracting the first transmission power level from a received signal strength indicator of the first communication message;
calculate a second transmission power level by subtracting the path loss associated with the first communication message from a target received signal strength indicator;
update a first power control information table entry stored in the electronic device with the second transmission power level;
transmit an acknowledgement message responsive to the first communication message, the acknowledgement message comprising a first transmission power information element that includes the second transmission power level;
make a first determination of a number of communication messages received since a previous power negotiation;
compare the number of the communication messages to a preset number of communication messages; and
calculate the path loss, calculate the second transmission power level, and update the first power control information table entry responsive to the number of the communication messages equaling the preset number of communication messages.

9. The electronic device of claim 8, wherein the instructions further cause the processor to be configured to:
send a third data frame to a second network device using a third transmission power level;
receive a second acknowledgment frame from the second network device, wherein the second acknowledgment frame comprises a second transmission power information element, and wherein the second transmission power information element comprises a fourth transmission power level;
update a second power control information table entry with the fourth transmission power level; and
send a fourth data frame to the second network device using the fourth transmission power level.

10. The electronic device of claim 8, wherein the wireless network comprises a ZIGBEE communication protocol wireless network.

11. The electronic device of claim 10, wherein the first transmission power information element further comprises a vendor identifier.

12. The electronic device of claim 10, wherein the electronic device comprises a coordinator configured to operate in the ZIGBEE communication protocol wireless network, and wherein the second electronic device comprises an end device configured to operate in the ZIGBEE communication protocol wireless network.

13. The electronic device of claim 8, wherein the first communication message comprises an enhanced beacon response.

14. The electronic device of claim 13, wherein the instructions further cause the processor to be configured to:
    extract the first transmission power level from the enhanced beacon response; and
    identify the received signal strength indicator as the received signal strength indicator of the enhanced beacon response.

15. The electronic device of claim 8, wherein the instructions further cause the processor to be configured to send a third message using the second transmission power level.

16. The electronic device of claim 8, wherein the previous power negotiation is an initial power negotiation.

17. The electronic device of claim 16, wherein the instructions further cause the processor to be configured to join the wireless network, wherein the initial power negotiation is performed when joining the wireless network.

18. The electronic device of claim 17, wherein the wireless network is an IEEE 802.15.4-based wireless network.

19. The electronic device of claim 8, wherein the instructions further cause the processor to be configured to, responsive to the number of the communication messages equaling the preset number of communication messages, determine whether the received signal strength indicator is outside a tolerance, wherein calculating the second transmission power level comprises calculating the second transmission power level responsive to the received signal strength indicator being outside the tolerance.

20. The electronic device of claim 8, wherein the instructions further cause the processor to be configured to transmit a second communication message using the first transmission power level before receiving the first communication message.

21. The electronic device of claim 20, wherein the first communication message comprises a data frame.

22. The electronic device of claim 8, wherein the first power control information table entry comprises an address associated with the second electronic device, the second transmission power level, and the received signal strength indicator.

23. The electronic device of claim 8, wherein the instructions further cause the processor to be configured to store a power control information table in the memory, the power control information table comprising the first power control information table entry and a second power control information table entry, and wherein the power control information table comprises an address, a transmission power level, and a last received signal strength indicator for each of the first power control information table entry and the second power control information table entry.

24. The electronic device of claim 8, wherein the first communication message is a unicast message.

25. An electronic device comprising:
    a memory configured to store computer-executable instructions; and
    a processor coupled to the memory and configured to execute the computer-executable instructions, wherein the instructions cause the processor to be configured to:
    perform an initial transmission power negotiation when joining a wireless network;
    receive a number of communication messages from a communication link in the wireless network;
    compare the number of communication messages to a preset number of communication messages; and
    perform a transmission power renegotiation when the number of communication messages is equal to the preset number of communication messages.

26. The electronic device of claim 25, wherein the instructions further cause the processor to be configured to:
    compare a received signal strength indicator of a last one of the communication messages received over the communication link to a preset received signal strength indicator; and
    perform the transmission power renegotiation responsive to the received signal strength indicator of the last one of the communication messages not being within the preset received signal strength indicator.

27. The electronic device of claim 25, wherein the instructions further cause the processor to be configured to:
    compare a recalculated target transmission power to a currently used transmission power; and
    perform the transmission power renegotiation responsive to the recalculated target transmission power being different than the currently used transmission power.

28. The electronic device of claim 25, wherein the communication messages comprise unicast frames from a sending network device.

29. The electronic device of claim 28, wherein the sending network device comprises an end device.

30. The electronic device of claim 28, wherein the sending network device comprises a router.

31. The electronic device of claim 25, wherein the instructions further cause the processor to be configured to:
    calculate a renegotiated transmission power level; and
    update a power control information table entry stored in the electronic device with the renegotiated transmission power level.

32. The electronic device of claim 31, wherein the instructions further cause the processor to be configured to send another communication message over the communication link in the wireless network using the renegotiated transmission power level.

33. The electronic device of claim 25, wherein, to perform the transmission power renegotiation, the instruction cause the processor to be configured to:
    determine a first transmission power level;
    update a power control information table entry with the first transmission power level; and
    transmit an acknowledgement message responsive to a communication message of the communication messages, the acknowledgement message comprising a first transmission power information element that includes the first transmission power level.

34. The electronic device of claim 33, wherein the instructions further cause the processor to be configured to, responsive to the number of communication messages not being equal to the preset number of communication messages, transmit another acknowledgement message without a transmission power information element.

35. An electronic device comprising:
    a memory configured to store computer-executable instructions; and
    a processor coupled to the memory and configured to execute the computer-executable instructions, wherein the instructions cause the processor to be configured to:
    receive a first communication message from a second electronic device in a wireless network through a communication link between the electronic device and the second electronic device, wherein the first communication message comprises a first transmission power level used to transmit the first communication message over the communication link;

calculate a path loss associated with the first communication message by subtracting the first transmission power level from a received signal strength indicator of the first communication message;

calculate a second transmission power level by subtracting the path loss associated with the first communication message from a target received signal strength indicator;

update a first power control information table entry stored in the electronic device with the second transmission power level;

transmit an acknowledgement message responsive to the first communication message, the acknowledgement message comprising a first transmission power information element that includes the second transmission power level;

receive a second data frame;

determining whether to renegotiation a transmission power level; and responsive to determining not to renegotiate the transmission power level, transmit a second acknowledgement message without a transmission power information element.

* * * * *